United States Patent [19]
Cunanan et al.

[11] Patent Number: 5,907,908
[45] Date of Patent: Jun. 1, 1999

[54] DEHUMIDIFYING POUCH

[75] Inventors: Joaquin Paz Cunanan, Kissimmee; David Prince Heaner, Maitland, both of Fla.; David J. Hanlon, Magnolia, Tex.

[73] Assignee: Tetra Technologies, Inc., The Woodlands, Tex.

[21] Appl. No.: 08/941,996

[22] Filed: Oct. 1, 1997

[51] Int. Cl.⁶ .................................................. F26B 19/00
[52] U.S. Cl. ...................................... 34/61; 34/80; 34/95
[58] Field of Search ................................. 34/60, 61, 79, 34/80, 81, 95

[56]  References Cited

U.S. PATENT DOCUMENTS

| | | | |
|---|---|---|---|
| 4,588,505 | 5/1986 | Walley et al. | 210/502.1 |
| 5,148,613 | 9/1992 | Cullen | 34/81 |
| 5,324,448 | 6/1994 | Mayeaux | 252/194 |
| 5,657,866 | 8/1997 | Kaneko et al. | 206/204 |
| 5,660,868 | 8/1997 | Yeager | 426/124 |
| 5,675,911 | 10/1997 | Moser | 34/60 X |

Primary Examiner—Henry Bennett
Assistant Examiner—Steve Gravini
Attorney, Agent, or Firm—Jo Katherine D'Ambrosio

[57]  ABSTRACT

A dehumidifying pouch comprising a container having a moisture-absorption compartment and a collection compartment, the moisture-absorption compartment comprising semi-permeable material that encloses a deliquescent desiccant material and an optional deodorizing material. The collection compartment comprises walls made of a moisture impervious material. The collection compartment is connected to the moisture-absorption compartment, preferably by a broken seal, so that liquids from the moisture-absorption compartment can be transferred to the collection compartment of the pouch. The semi-permeable material can comprise polyethylene or expanded polytetrafluoroethylene, individually or a combination thereof. The moisture impervious compartment can comprise either polyethylene film or polypropylene film. Alternatively, the dehumidifying pouch is comprised of one compartment having a moisture-absorption section and a moisture collection section. The dehumidifying pouch is non-spillable under normal use conditions and is disposable.

30 Claims, 2 Drawing Sheets

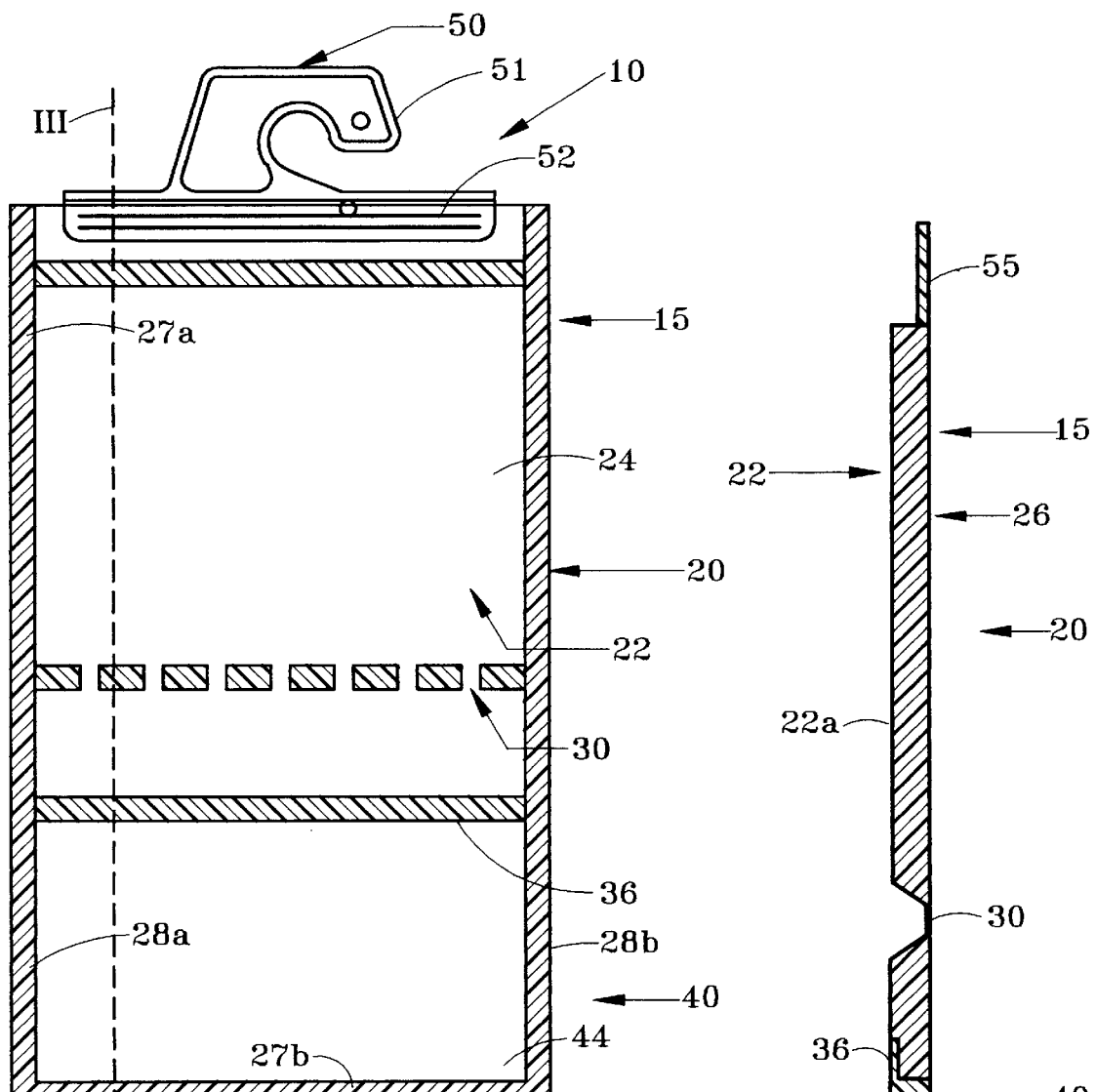

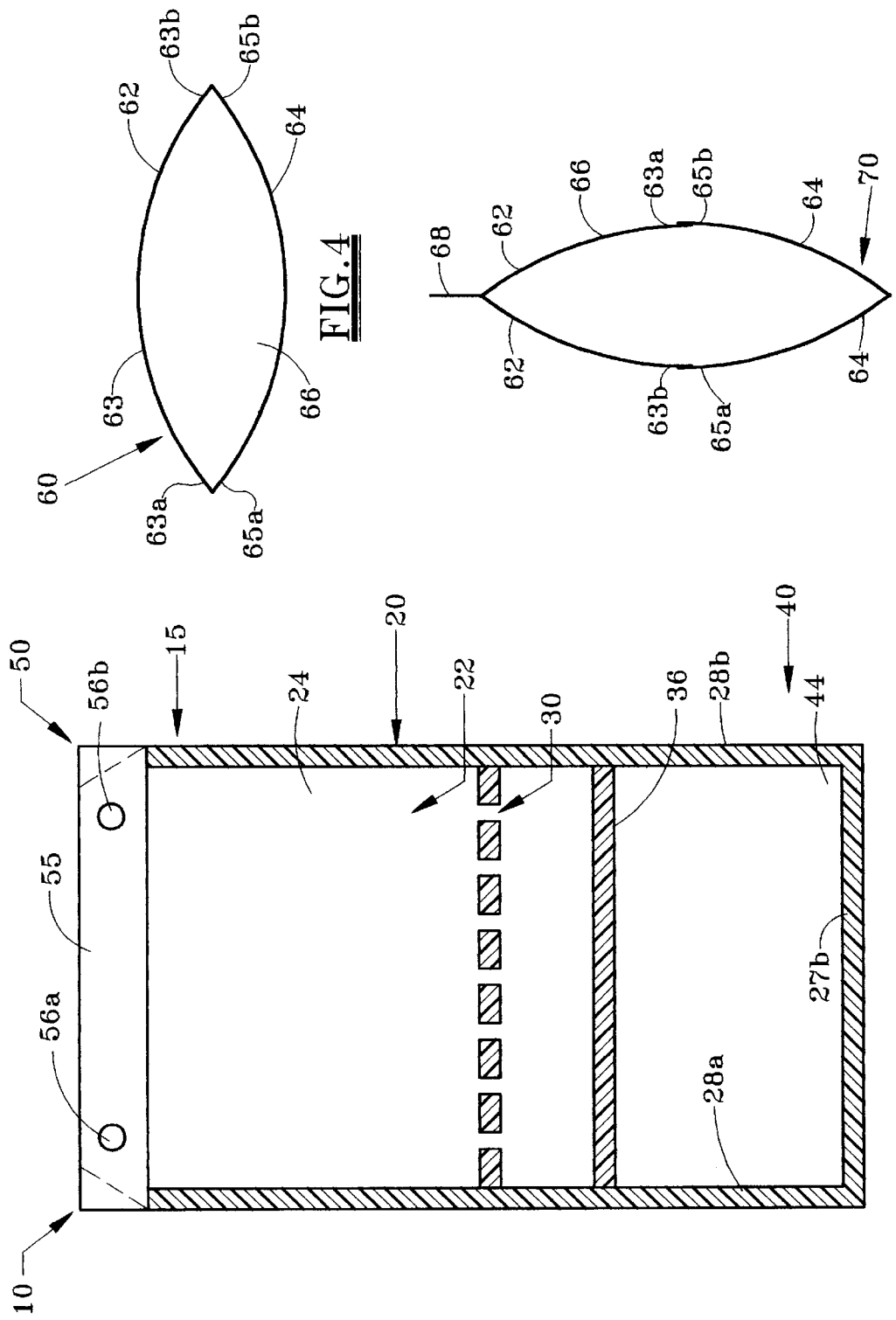

DEHUMIDIFYING POUCH

FIELD OF THE INVENTION

The present invention relates to a dehumidifying and deodorizing pouch. Preferably, the invention is a disposable dehumidifying and deodorizing pouch having a moisture-absorption section and a moisture collection section.

BACKGROUND OF THE INVENTION

Atmospheric water vapor is problematic in many situations. This is particularly so in situations combining high humidity with close or closed environments such as crowded rooms or closets; the presence of hydrophilic materials; and intermittently opened containers of organic liquids such as gasoline. Some of the problems high humidity can cause are caking of dried powder and granular substances, increase growth of mildew and fungi, corrosion of metal surfaces, and water contamination of organic liquids (especially internal combustion engine fuels). A variety of solutions have evolved or been developed in the field to address these problem situations.

Trapped water can be a source of corrosion in a high humidity environment. A solution to this situation is suggested by Walley et al., U.S. Pat. No. 4,588,505. Walley et al. provide a weighted, open mesh pouch containing a water absorbent to be placed at the bottom of, for example, a gasoline drum. This device absorbs water only from a liquid phase but does not prevent the initial water contamination from forming.

Mayeaux, U.S. Pat. No. 5,324,448, suggests a packet including a composition combining a desiccant and a vaporous corrosion inhibitor for use where corrosion is caused by atmospheric humidity in electronic components. Some powders and granules (salt, sugar, amino acids, etc.) can cake or form clumps when exposed to high humidity. A number of additives are know in the art for preventing such caking or clumping, such as aluminum silicate in table salt. Kaneko et al, U.S. Pat. No. 5,657,866, provide a "double bag" packaging system comprising inner water permeable and outer water impermeable liners holding a desiccant between them.

Yeager, U.S. Pat. No. 5,660,868, teaches a dual compartment food storage bag with one compartment containing a soaker pad for absorbing liquids and the other compartment for containing food. The overall bag is sealable, but the two compartments communicate by means of perforations in a shared compartment wall between them.

The above technologies have the limitation that the desiccants they use cannot be deliquescent. A deliquescent composition is one that melts away or dissolves gradually and becomes a liquid by attracting and absorbing moisture from the air. If a deliquescent composition were used in the above situations, the resultant liquid would itself be a contaminant. Further, because deliquescent derived liquids contain chemicals and have chemical properties different from pure water, in the case of contact with food, they could be toxic.

In high humidity situations, involving relatively close or closed environment such as a clothes or storage closet, camper or similar space, the relatively high water vapor extraction capabilities of a deliquescent is more desirable than other types of desiccants. Deliquescents have been used for such applications. Cullen, U.S. Pat. No. 5,148,613, discloses a closet drier in a bucket conformation, having upper and lower compartments and an open top covered with a gas permeable membrane. The Cullen device is an open container and must be placed on the floor or some other surface.

It would be desirable to have an easily disposable, non-spillable dehumidifying pouch, preferably composed of inexpensive materials. What is also needed is a non-spillable pouch that can be hung in a closet or storage area so that clothes or articles that need to be dry will not be accidentally contaminated by the dehumidifying and deodorizing pouch.

SUMMARY OF THE INVENTION

The dehumidifying pouch is both non-spillable under normal use conditions and disposable. Preferably, the dehumidifying pouch also comprises deodorizing material. The preferred dehumidifying pouch comprises a container comprising a moisture-absorption compartment and a collection compartment; the moisture-absorption compartment comprising a semi-permeable material, preferably a membrane, enclosing deliquescent desiccant material and an optional deodorizing material.

Preferably, the moisture-absorption compartment is connected to the collection compartment so that liquid moisture from the moisture-absorption compartment is transferred to the collection compartment. In one aspect of the invention, the semi-permeable material, preferably a membrane, comprises a polymer. The polymer can comprise polyethylene or expanded polytetrafluoroethylene, individually or a combination thereof. The collection compartment can comprise walls made of a moisture-impervious material. Preferably, the moisture-impervious material comprises laminated film, more preferably, the material comprises polyethylene film. Alternatively, the moisture impervious material comprises polypropylene film.

In another preferred aspect of this invention, the desiccant material comprises a salt selected from the group consisting of alkali metal halides, alkaline earth metal halides, iron halides and aluminum halides, individually or a combination thereof. The desiccant material can further comprise a fragrance. The deodorizing material can comprise activated carbon, zeolite or molecular sieves, individually or in a combinations thereof. In one embodiment, the pouch can be comprised of transparent material. The preferred collection compartment is connected to the moisture-absorption compartment by a broken seal so that liquid from the moisture-absorption compartment is transferred by gravity to the moisture-absorption compartment. In a preferred embodiment, the pouch comprises a hanger for hanging the pouch above ground level.

In another preferred embodiment, the dehumidifying and deodorizing pouch comprises a container comprising a first panel and a second panel, the first panel opposite the second panel and the first and second panels forming at least two enclosed compartments, the compartments comprising a moisture-absorption compartment and a collection compartment. Preferably, the first panel comprises a moisture-impervious material in the area of both the moisture-absorption compartment and the collection compartment, whereas the second panel comprises a moisture-impervious material in the area of the collection compartment and semi-permeable material, preferably a membrane, in the area of the moisture-absorption compartment. The moisture-absorption compartment encloses a deliquescent desiccant material and deodorizing material. Preferably, the moisture-absorption compartment is connected to the collection compartment so that liquid moisture from the deliquescing desiccant in the moisture-absorption compartment is transferred to the collection compartment.

In a preferred embodiment, the first panel comprises moisture-impervious material in the area of the collection compartment and semi-permeable material, preferably a membrane, in the area of the moisture-absorption compartment. In this embodiment, the first panel comprises moisture-impervious material in the area of the collection compartment and both moisture-impervious material and semi-permeable material in the area of the moisture-absorption compartment.

In another preferred embodiment, the dehumidifying and deodorizing pouch comprises a container having a first panel and a second panel with the first panel opposite the second panel and the first and second panels forming at least two enclosed compartments, a moisture-absorption compartment and a collection compartment. The first panel and second panel can be comprised if a moisture-impervious material in the area of the collection compartment and semi-permeable material in the area of the moisture-absorption compartment. The moisture-absorption compartment can enclose a deliquescent desiccant material and deodorizing material. Preferably, the moisture-absorption compartment is connected to the collection compartment and separated from the collection compartment by a broken seal so that liquid moisture from the moisture-absorption compartment is transferred to the collection compartment.

Alternatively, the first panel comprises moisture-impervious material in the area of the collection compartment and both moisture-impervious material and semi-permeable material, preferably a membrane, in the area of the moisture-absorption compartment. The semi-permeable material can comprise a polymer. The polymer can comprise polyethylene or expanded polytetrafluoroethylene, individually or a combination thereof. The moisture-impervious material of the collection compartment can comprise polyethylene film or polypropylene film.

The preferred desiccant material comprises a salt selected from the group consisting of alkali metal halides, alkaline earth metal halides, iron halides and aluminum halides, individually or a combination thereof. The desiccant material can further comprise a fragrance. The deodorizing material preferably comprises activated carbon, zeolite or molecular sieves, individually or in a combinations thereof.

In still another embodiment the dehumidifying and deodorizing pouch comprises a container having a first panel and a second panel, the first panel opposite the second panel and the first and second panels that form an enclosed compartment. The compartment can enclose desiccant material alone or both desiccant and deodorizing material. Preferably, the first panel comprises a moisture-impervious material and the second panel comprises semi-permeable material.

In another preferred embodiment, the dehumidifying pouch comprises a container having a first panel and a second panel, the first panel opposite the second panel so that the first and second panels form at least two enclosed compartments, the compartments comprising a moisture-absorption compartment and a collection compartment. Preferably, the first panel comprises a moisture-impervious material in the area of both the moisture-absorption compartment and the collection compartment and the second panel comprises a moisture-impervious material in the area of the collection compartment and semi-permeable material in the area of the moisture-absorption compartment. Preferably, the moisture-absorption compartment encloses deliquescent desiccant material. More preferably, the moisture-absorption compartment is connected to the collection compartment so that liquid moisture from the moisture-absorption compartment is transferred to the collection compartment.

The moisture-absorption compartment can further contain a deodorizing material comprising activated carbon, zeolite or molecular sieve, individually or in a combination thereof. Preferably, the polymer comprising the moisture-absorption compartment comprises polyethylene or expanded polytetrafluoroethylene, individually or a combination thereof.

BRIEF DESCRIPTION OF THE DRAWINGS

FIG. 1 is a front sectional view of a dehumidifying and deodorizing pouch according to the present invention.

FIG. 2 is a front sectional view of an alternative embodiment of the dehumidifying and deodorizing pouch according to the present invention.

FIG. 3 is a cross-sectional view of the invention as shown in FIG. 1, taken along line A—A.

FIG. 4 is a side view of an alternative embodiment of a dehumidifying and deodorizing pouch according to this invention.

FIG. 5 is a side view of a further alternative embodiment as shown in FIG. 4.

DETAILED DESCRIPTION OF THE INVENTION

Reference will now be made in detail to the present preferred embodiment of the invention as depicted in the accompanying drawings and example. In a preferred embodiment of the dehumidifying and deodorizing bag 10 as shown in FIG. 1, the pouch 10 comprises a container 15 having two compartments 20, 40. One compartment 20 is for absorbing moisture vapors from the surrounding atmosphere, the other compartment 40 is for receiving liquid moisture from the moisture-absorption compartment 20. The moisture-absorption compartment 20 can contain a deliquescent desiccant and can also optionally include a deodorant and/or air freshener. In this preferred embodiment, a hanger 50 is used so that the pouch 10 can be hung in any closed room or closet that has a problem with humidity and/or odors. The desiccant contained within the moisture-absorption compartment 20 absorbs moisture vapors. As the desiccant becomes saturated with moisture vapors and deliquesces, the liquefied desiccant is transferred to the collection compartment 40. Because the materials comprising the pouch 10 are inexpensive, the dehumidifying and deodorizing pouch 10 may be disposed when the collection compartment is full even though the deliquescent desiccant could otherwise continue to absorb moisture vapors.

The container 15, as illustrated in FIG. 3, is formed by a front panel 22 sealed along edges to a back panel 26. In this preferred embodiment, a broken seal 30 separates the moisture-absorption compartment 20 from the collection compartment 40 so that deliquescent formed in the moisture-absorption compartment 20 can be transferred to the collection compartment 40 by gravity if the pouch 10 is hung so that the moisture-absorption compartment 20 is above the collection compartment 40.

The moisture-absorption compartment 20 comprises semi-permeable material, preferably a membrane, that allows diffusion of moisture vapors into the moisture-absorption compartment 20. The diffusion is not reversible under normal use conditions. Preferably, the semi-permeable membrane is a polymer material. More preferably, the semi-permeable membrane comprises polyethylene, commonly sold under the tradename, TYVEK, or, expanded polytetrafluoroethylene, available under the mark, GORTEX. In one embodiment, the entire moisture-absorption compartment 20 is comprised of semi-permeable material. Alternatively, the moisture-absorption compartment 20 is comprised in part of semi-permeable material and in part moisture-impervious material. The rate of moisture uptake by the moisture-absorption compartment 20 is controlled by the amount of semi-permeable material used to make the compartment 20. Moisture uptake can be reduced by reducing the amount of semi-permeable material used to form the moisture-absorption compartment 20.

FIGS. 1 and 3, for example, illustrate an embodiment that uses semi-permeable membrane on one side of the moisture-absorption compartment 20 in a two-compartment pouch 10. Preferably, the opposite side of the moisture-absorption compartment and the collection compartment are comprised of moisture-impervious material. The pouch 10 comprises two panels 22, 26: a two-part front panel 22a, 22b and a single back panel 26. The panels 22, 26 are sealed along their top edges 27a, 27b and side edges 28a, 28b and sealed with a broken seal 30 from one edge 28a to the other edge 28b so that liquids from the moisture-absorption compartment 20 can flow down by gravity into the collection compartment 40. The front panel 22a, 22b is formed from two different materials, semi-permeable material in the area of the moisture-absorption compartment 22a and moisture-impervious material in the area of the collection compartment 22b. The two materials are joined to form a seal 36. Because water vapor pressure is greater in the surrounding atmosphere, moisture vapors enter the pouch 10 by passing through the semi-permeable membrane 22a in the area of the moisture-absorption compartment 20, the vapors are absorbed by the desiccant until it deliquesces, and the deliquescent then flows down into the collection compartment 40.

In other embodiments, the amount of semi-permeable material used to form the front panel 22a of the moisture-absorption compartment 20 can be varied to vary the rate of moisture uptake. In an alternate embodiment (not shown), a moisture-impervious cover material can be removably attached to the semi-permeable material so that the user can vary the rate of moisture uptake by removing the cover material.

The semi-permeable material preferably comprises polyethylene, commonly sold under the tradename, TYVEK, or expanded polytetrafluoroethylene, available under the mark, GORTEX. The moisture-impervious material can be laminated. Preferably, the moisture-impervious material is comprised of a polyolefin film such as polyethylene, more preferably, 6 mil polyethylene film. Alternatively, the moisture-impervious material is comprised of polypropylene film. In another aspect of the dehumidifying and deodorizing pouch 10, either the moisture-absorption semi-permeable material or the moisture-impervious material used to form the pouch can be comprised of transparent material.

In another aspect of the invention, all seals 30, 36 on the pouch 10 should be tight enough to prevent leakage if dropped from a height of 10 feet when the moisture-absorption compartment 20 is filled with 16 ounces of desiccant and the collection compartment 40 is 75% full of liquid.

In still another aspect, the desiccant material used for moisture absorption is preferably comprised of a salt selected from the group consisting of alkali metal halides, alkaline earth metal halides, iron halides and aluminum halides, individually or combinations thereof. Preferably, the desiccant material is comprised of calcium chloride. The deodorizing material can be activated carbon, zeolite or molecular sieves, individually or in combinations thereof. In an alternative embodiment, the desiccant material can further comprise a fragrance.

In a preferred embodiment, the dehumidifying and deodorizing pouch 10 has hangers 50, 55 so that the pouch 10 can be hung above the ground or floor. In one embodiment as illustrated in FIG. 1, the hanger 50 is a hook 51 that is sealed to the container 15 of the pouch 10. Preferably the hook 51 is comprised of a polymer having enough strength to bear the weight of the container when it is at its fullest with desiccant and liquid. In another embodiment as illustrated in FIG. 2, the hanger 50 is an extension 55 of the container 15. The extension 55 defines one or more holes 56a, 56b for hanging. Preferably the extension 55 is reinforced to bear the weight of the pouch 10.

In an alternate embodiment as illustrated in FIG. 4, the dehumidifying and deodorizing pouch 60 comprises a container 61 enclosing one compartment 66. Preferably, the container 61 comprises a first panel 62 and a second panel 64. The edges 63a, 63b of the first panel 62 are sealed to the edges 65a, 65b of the second panel 64. Preferably, the first panel 62 is comprised of a moisture-absorption material. The moisture-absorption material can be semi-permeable material, preferably a membrane, comprising polyethylene, commonly sold under the tradename, TYVEK, or, expanded polytetrafluoroethylene, available under the mark, GORTEX. The second panel 64 is comprised of a moisture-impervious material, preferably a polyolefin such as polyethylene or polypropylene. Alternatively, the material of the second panel 64 is laminated. In one preferred embodiment, the first panel 62 is the upper panel and the second panel 64 is on the bottom and rests on the ground or wherever the pouch 60 is placed. In this way, liquids will not leak out of the pouch 10 from the moisture-absorption membrane. In one embodiment, the material of the first and second panels 62, 64 are transparent. FIG. 5 illustrates still another alternative embodiment 70 of a one-compartment dehumidifying and deodorizing pouch 60 that can be used with a hanging device 68.

The compartment 60, 70, as shown in FIGS. 4 and 5, can contain a desiccant or both a desiccant and a deodorant as described above for FIG. 1. The desiccant material is preferably comprised of a salt selected from the group consisting of alkali metal halides, alkaline earth metal halides, iron halides and aluminum halides, individually or combinations thereof. Preferably, the desiccant material is comprised of calcium chloride. The deodorizing material can be activated carbon, zeolite or molecular sieves, individually or in combinations thereof. In an alternative embodiment, the desiccant material can further comprise a fragrance.

EXAMPLE

Conventional plastic cups used for containing desiccants were compared to the dehumidifying and deodorizing pouch of this invention as follows:

The moisture absorption capabilities of a dry calcium chloride sample containing 80% calcium chloride and 20% water were evaluated using a standard DampRid™ small plastic cup and the dehumidifying and deodorizing pouch. An aliquot of 300 g of calcium chloride pellets was evaluated for moisture absorption capabilities at 75% relative humidity and 50 C utilizing a controlled humidity/controlled temperature environmental chamber. The average results of triplicate measurements are shown in the following table:

|                      | 80% CaCl2 in Cup | 80% CaCl2 in Bag |
| -------------------- | ---------------- | ---------------- |
| First drop formed (min) | ~30           | ~60              |
| 2 hr(% H2O absorbed) | 4.4              | 2.0              |
| 4 hr(% H2O absorbed) | 7.8              | 6.4              |
| 7 hr(% H2O absorbed) | 11.3             | 10.4             |
| 24 hr(% H2O absorbed) | 36.9            | 33.9             |
| 30 hr(% H2O absorbed) | 43.9            | 40.1             |
| 48 hr(% H2O absorbed) | 51.9            | 44.2             |
| 72 hr(% H2O absorbed) | 56.9            | 47.6             |

The results indicate that the inexpensive dehumidifying and deodorizing pouch performs comparably to the conventional dehumidifying cup. The pouch of this invention is able to withdraw moisture from the surrounding atmosphere as well as the previous known dehumidifying cup. The dehumidifying pouch, however, is easier to use because it is not subject to spills and it is disposable.

The foregoing description is illustrative and explanatory of preferred embodiments of the invention, and variations in the size, shape, materials and other details will become apparent to those skilled in the art. It is intended that all such variations and modifications which fall within the scope or spirit of the appended claims be embraced thereby.

We claim:

1. A dehumidifying and deodorizing pouch comprising:
    a container comprising a moisture-absorption compartment and a collection compartment;
    the moisture-absorption compartment comprising semi-permeable material enclosing deliquescent desiccant material and an optional deodorizing material;
    the moisture-absorption compartment connected to the collection compartment so that liquid moisture from the moisture-absorption compartment is transferred to the collection compartment.

2. The dehumidifying and deodorizing pouch of claim 1 wherein the semi-permeable material comprises a polymer.

3. The dehumidifying and deodorizing pouch of claim 2 wherein the polymer comprises polyethylene or expanded polytetrafluoroethylene, individually or a combination thereof.

4. The dehumidifying and deodorizing pouch of claim 1 wherein the collection compartment comprises walls made of a moisture-impervious material.

5. The dehumidifying and deodorizing pouch of claim 4 wherein the moisture-impervious material comprises laminated film.

6. The dehumidifying and deodorizing pouch of claim 4 wherein the moisture-impervious material comprises polyethylene film.

7. The dehumidifying and deodorizing pouch of claim 4 wherein the moisture-impervious material comprises polypropylene film.

8. The dehumidifying and deodorizing pouch of claim 7 wherein the desiccant material comprises a salt selected from the group consisting of alkali metal halides, alkaline earth metal halides, iron halides and aluminum halides, individually or a combination thereof.

9. The dehumidifying and deodorizing pouch of claim 1 wherein the desiccant material further comprises a fragrance.

10. The dehumidifying and deodorizing pouch of claim 1 wherein the deodorizing material comprises activated carbon, zeolite or molecular sieves, individually or in a combination thereof.

11. The dehumidifying and deodorizing pouch of claim 1 wherein the pouch is comprised of transparent material.

12. The dehumidifying and deodorizing pouch of claim 1 wherein the collection compartment is connected to the moisture-absorption compartment by a broken seal.

13. The dehumidifying and deodorizing pouch of claim 1 wherein the pouch comprises a hanger for hanging the pouch above ground level.

14. A dehumidifying and deodorizing pouch comprising:
    a container comprising a first panel and a second panel, the first panel opposite the second panel and the first and second panels forming at least two enclosed compartments, the compartments comprising a moisture-absorption compartment and a collection compartment;
    the first panel comprising a moisture-impervious material in the area of both the moisture-absorption compartment and the collection compartment;
    the second panel comprising a moisture-impervious material in the area of the collection compartment and semi-permeable material in the area of the moisture-absorption compartment;
    the moisture-absorption compartment enclosing a deliquescent desiccant material and deodorizing material;
    the moisture-absorption compartment connected to the collection compartment so that liquid moisture from the moisture-absorption compartment is transferred to the collection compartment.

15. The dehumidifying and deodorizing pouch of claim 14 wherein the first panel comprises moisture-impervious material in the area of the collection compartment and semi-permeable material in the area of the moisture-absorption compartment.

16. The dehumidifying and deodorizing pouch of claim 14 wherein the first panel comprises moisture-impervious material in the area of the collection compartment and both moisture-impervious material and semi-permeable material in the area of the moisture-absorption compartment.

17. A dehumidifying and deodorizing pouch comprising:
    a container comprising a first panel and a second panel, the first panel opposite the second panel and the first and second panels forming at least two enclosed compartments, the compartments comprising a moisture-absorption compartment and a collection compartment;
    the first panel and second panel comprising a moisture-impervious material in the area of the collection compartment and semi-permeable material in the area of the moisture-absorption compartment;
    the moisture-absorption compartment enclosing a deliquescent desiccant material and deodorizing material;
    the moisture-absorption compartment connected to the collection compartment and separated from the collection compartment by a broken seal so that liquid moisture from the moisture-absorption compartment is transferred to the collection compartment.

18. The dehumidifying and deodorizing pouch of claim 17 wherein the first panel comprises moisture-impervious material in the area of the collection compartment and both moisture-impervious material and semi-permeable material in the area of the moisture-absorption compartment.

19. The dehumidifying and deodorizing pouch of claim 17 wherein the semi-permeable material comprises a polymer.

20. The dehumidifying and deodorizing pouch of claim 17 wherein the collection compartment comprises a moisture-impervious material.

21. The dehumidifying and deodorizing pouch of claim 17 wherein the moisture-impervious material comprises polyethylene film.

22. The dehumidifying and deodorizing pouch of claim 17 wherein the moisture-impervious material comprises polypropylene film.

23. The dehumidifying and deodorizing pouch of claim 17 wherein the desiccant material comprises a salt selected from the group consisting of alkali metal halides, alkaline earth metal halides, iron halides and aluminum halides, individually or a combination thereof.

24. The dehumidifying and deodorizing pouch of claim 17 wherein the desiccant material further comprises a fragrance.

25. The dehumidifying and deodorizing pouch of claim 17 wherein the deodorizing material comprises activated carbon, zeolite or molecular sieves, individually or in a combinations thereof.

26. A dehumidifying and deodorizing pouch comprising:

a container comprising a first panel and a second panel, the first panel opposite the second panel and the first and second panels forming an enclosed compartment, the compartment enclosing desiccant material and deodorizing material.

27. The dehumidifying and deodorizing pouch of claim 26 wherein the first panel comprises a moisture-impervious material.

28. The dehumidifying and deodorizing pouch of claim 26 wherein the second panel comprises semi-permeable material.

29. A dehumidifying pouch comprising:

a container comprising a first panel and a second panel, the first panel opposite the second panel and the first and second panels forming at least two enclosed compartments, the compartments comprising a moisture-absorption compartment and a collection compartment;

the first panel comprising a moisture-impervious material in the area of both the moisture-absorption compartment and the collection compartment;

the second panel comprising a moisture-impervious material in the area of the collection compartment and semi-permeable material in the area of the moisture-absorption compartment;

the moisture-absorption compartment enclosing deliquescent desiccant material;

the moisture-absorption compartment connected to the collection compartment so that liquid moisture from the moisture-absorption compartment is transferred to the collection compartment.

30. The dehumidifying pouch of claim 29 further comprising a deodorizing material comprising activated carbon, zeolite or molecular sieve, individually or in a combination thereof.

* * * * *